US010789208B2

(12) United States Patent
Bregler et al.

(10) Patent No.: US 10,789,208 B2
(45) Date of Patent: Sep. 29, 2020

(54) DEPENDENCY MAPPING IN A DATABASE ENVIRONMENT

(71) Applicant: SAP SE, Walldorf (DE)

(72) Inventors: Jonathan Bregler, Kraichtal (DE); Alexander Bunte, Heidelberg (DE); Arne Harren, Walldorf (DE); Andreas Kellner, Birkenau (DE); Daniel Kuntze, Bruchsal (DE); Simon Lueders, Walldorf (DE); Volker Sauermann, Dossenheim (DE); Michael Schnaubelt, Leimen (DE); Le-Huan Stefan Tran, Malsch (DE)

(73) Assignee: SAP SE, Walldorf (DE)

( * ) Notice: Subject to any disclaimer, the term of this patent is extended or adjusted under 35 U.S.C. 154(b) by 184 days.

(21) Appl. No.: 15/666,967

(22) Filed: Aug. 2, 2017

(65) Prior Publication Data

US 2019/0042588 A1 Feb. 7, 2019

(51) Int. Cl.
*G06F 16/00* (2019.01)
*G06F 16/14* (2019.01)
*G06F 16/13* (2019.01)
*G06F 16/901* (2019.01)
*G06F 16/23* (2019.01)

(52) U.S. Cl.
CPC ............ *G06F 16/148* (2019.01); *G06F 16/13* (2019.01); *G06F 16/2365* (2019.01); *G06F 16/9017* (2019.01)

(58) Field of Classification Search
CPC ..... G06F 16/148; G06F 16/9017; G06F 16/13
USPC ......................................................... 707/706
See application file for complete search history.

(56) References Cited

U.S. PATENT DOCUMENTS

| 8,386,509 | B1* | 2/2013 | Scofield | G06F 16/9535 |
| | | | | 707/769 |
| 9,311,064 | B1* | 4/2016 | Whittington | G06F 8/433 |
| 9,600,269 | B1 | 3/2017 | Bregler et al. | |
| 2003/0217027 | A1* | 11/2003 | Farber | G06F 16/9024 |
| 2006/0015490 | A1* | 1/2006 | Denuit | G06F 16/24526 |

(Continued)

*Primary Examiner* — Hanh B Thai
(74) *Attorney, Agent, or Firm* — Fountainhead Law Group P.C.

(57) ABSTRACT

Embodiments map from a database environment, dependencies between files created at designtime and corresponding runtime data objects defined by deployment of those files. A dependency table is populated with dependency information (e.g., origin, target, dependency type) extracted during deployment. That dependency information may be searched according to user-specified parameters (e.g., a file provides an object; an object requires a file), to allow rapid correlation between designtime file(s) and related runtime data object (s). Embodiments are particularly useful in visualizing complex (e.g., one-to-many; many-to-one) file-object dependencies characteristic of modern database environments. Queries posed to the dependency table may further seek intra-designtime dependency information (e.g., one file depends upon another file; one file impacts another file), and/or intra-runtime dependency information (e.g., table objects referenced by view objects; view objects referenced by procedure objects). Dependency information may be recursively searched in an iterative manner in order to construct dependency pathways reflecting complex file-object relationships.

15 Claims, 5 Drawing Sheets

(56) References Cited

U.S. PATENT DOCUMENTS

| | | | |
|---|---|---|---|
| 2006/0095248 A1* | 5/2006 | Menezes | G06F 40/44 704/3 |
| 2008/0177722 A1* | 7/2008 | Lohman | G06F 16/90335 |
| 2008/0189206 A1* | 8/2008 | Choi | G06F 16/84 705/39 |
| 2008/0256121 A1* | 10/2008 | Liu | G06F 16/283 |
| 2010/0131082 A1* | 5/2010 | Chandler | G06F 17/18 700/30 |
| 2011/0252005 A1* | 10/2011 | Lauer | G06F 16/2471 707/690 |
| 2012/0173693 A1* | 7/2012 | Zhang | H04L 41/5041 709/223 |
| 2012/0174064 A1* | 7/2012 | Polly | G06Q 10/10 717/120 |
| 2013/0173591 A1* | 7/2013 | Cras | G06F 16/2455 707/718 |
| 2013/0262443 A1* | 10/2013 | Leida | G06F 16/2452 707/722 |
| 2014/0059513 A1* | 2/2014 | Sabo | G06F 8/70 717/101 |
| 2014/0173574 A1* | 6/2014 | Schmidt | G06F 8/43 717/143 |
| 2014/0188951 A1* | 7/2014 | Hanamoto | G06F 16/164 707/821 |
| 2015/0248280 A1* | 9/2015 | Pillay | G06F 8/60 717/106 |
| 2015/0278736 A1* | 10/2015 | Spera | G06Q 10/0633 705/7.23 |
| 2016/0125029 A1* | 5/2016 | Damm | G06F 16/24552 707/722 |
| 2016/0156387 A1* | 6/2016 | Ota | H04B 5/0037 320/108 |
| 2016/0335009 A1* | 11/2016 | Vijayan | G06F 3/065 |
| 2016/0342650 A1* | 11/2016 | Damm | G06F 16/24552 |
| 2017/0031616 A1* | 2/2017 | Vijayan | G06F 3/0683 |
| 2017/0147310 A1 | 5/2017 | Bregler et al. | |
| 2017/0147311 A1 | 5/2017 | Bregler et al. | |
| 2017/0371649 A1* | 12/2017 | Li | G06F 8/71 |
| 2018/0060341 A1* | 3/2018 | Wu | G06F 16/148 |

* cited by examiner

DEPENDENCY MAPPING IN A DATABASE ENVIRONMENT

BACKGROUND

Unless otherwise indicated herein, the approaches described in this section are not prior art to the claims in this application and are not admitted to be prior art by inclusion in this section.

Databases are useful tools for storing large volumes of data that may be related in some manner. During runtime in a database environment, database data may be stored in the form of database objects (such as tables, views, and procedures) whose internal structure reflects relationships existing between various pieces of data.

At designtime in a database environment, database objects may be defined by specific files provided by a developer. Under certain circumstances the relationship between a file and a database object defined therefrom, may be relatively simple. That is, in some cases a single file defines a single database object.

However, more complex connections may exist between file(s) and database object(s). An example is a one-to-many relationship, where a single file defines multiple database objects. Another example is a many-to-one relationship, where multiple files define a single database object.

SUMMARY

Embodiments perform mapping from a database environment, of dependencies between files created at designtime and corresponding runtime data objects defined by deployment of those files. A dependency table is populated with dependency information (e.g., origin, target, dependency type) that is extracted during deployment. The dependency information may be searched according to user-specified parameters (e.g., a file provides an object; an object requires a file) in order to allow rapid correlation between designtime file(s) and corresponding runtime data object(s). Embodiments are particularly useful in visualizing complex (e.g., one-to-many, many-to-one) file-object dependencies characteristic of large modern database environments. Queries posed to the dependency table may further seek intra-designtime file dependency information (e.g., one file depends upon another file; one file impacts another file), and/or intra-runtime dependency information between different runtime data objects (e.g., tables referenced by views; views referenced by procedures). Stored dependency information may be recursively searched in an iterative manner to construct dependency pathways reflecting complex file-object dependencies.

An embodiment of a computer-implemented method comprises receiving a query parameter regarding a database environment comprising a first designtime file and a first runtime data object defined by the first designtime file. A table comprising a first dependency in the database environment between the first designtime file and the first runtime data object, is searched with reference to the query parameter. A query result including the first dependency is stored. The query result is communicated to a user.

In certain embodiments the query parameter specifies the first designtime file.

According to particular embodiments the query parameter specifies the first runtime data object.

In some embodiments the first designtime file also defines a second runtime data object of the database environment, and the first dependency is further between the first designtime file and the second runtime data object.

According to various embodiments a second designtime file of the database environment also defines the first runtime data object, and the first dependency is further between the second designtime file and the first runtime data object.

In certain embodiments searching the table comprises recursively searching the table to identify a second dependency and the query result comprises a dependency path including the second dependency.

According to some embodiments recursively searching the table identifies the second dependency between the first designtime file and a second designtime file of the database environment.

In particular embodiments recursively searching the table identifies the second dependency between the first runtime data object and a second runtime data object of the database environment.

According to various embodiments the dependency table is stored in an in-memory database, and the searching is performed by an engine of the in-memory database.

In some embodiments the database environment comprises the in-memory database.

A non-transitory computer readable storage medium embodies a computer program for performing a method comprising receiving a query parameter regarding a database environment comprising a first designtime file and a first data object defined by the first designtime file. A table comprising a first dependency in the database environment between the first designtime file and the first runtime data object, is searched with reference to the query parameter. A query result including the first dependency is stored. The query result is communicated to a user.

An embodiment of a computer system comprises one or more processors and a software program executable on said computer system. The software program is configured to cause an engine of an in-memory database to store in the in-memory database, a table comprising a first dependency between a first designtime file and a first runtime data object defined by the first designtime file. The software program is further configured to cause the in-memory database engine, in response to a query parameter received from a user, to search the table to identify the first dependency. The software program is further configured to cause the in-memory database engine to communicate to the user, a query result comprising the first dependency.

The following detailed description and accompanying drawings provide a better understanding of the nature and advantages of embodiments.

DETAILED DESCRIPTION

Described herein are methods and apparatuses that are configured to perform dependency mapping in a database environment. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
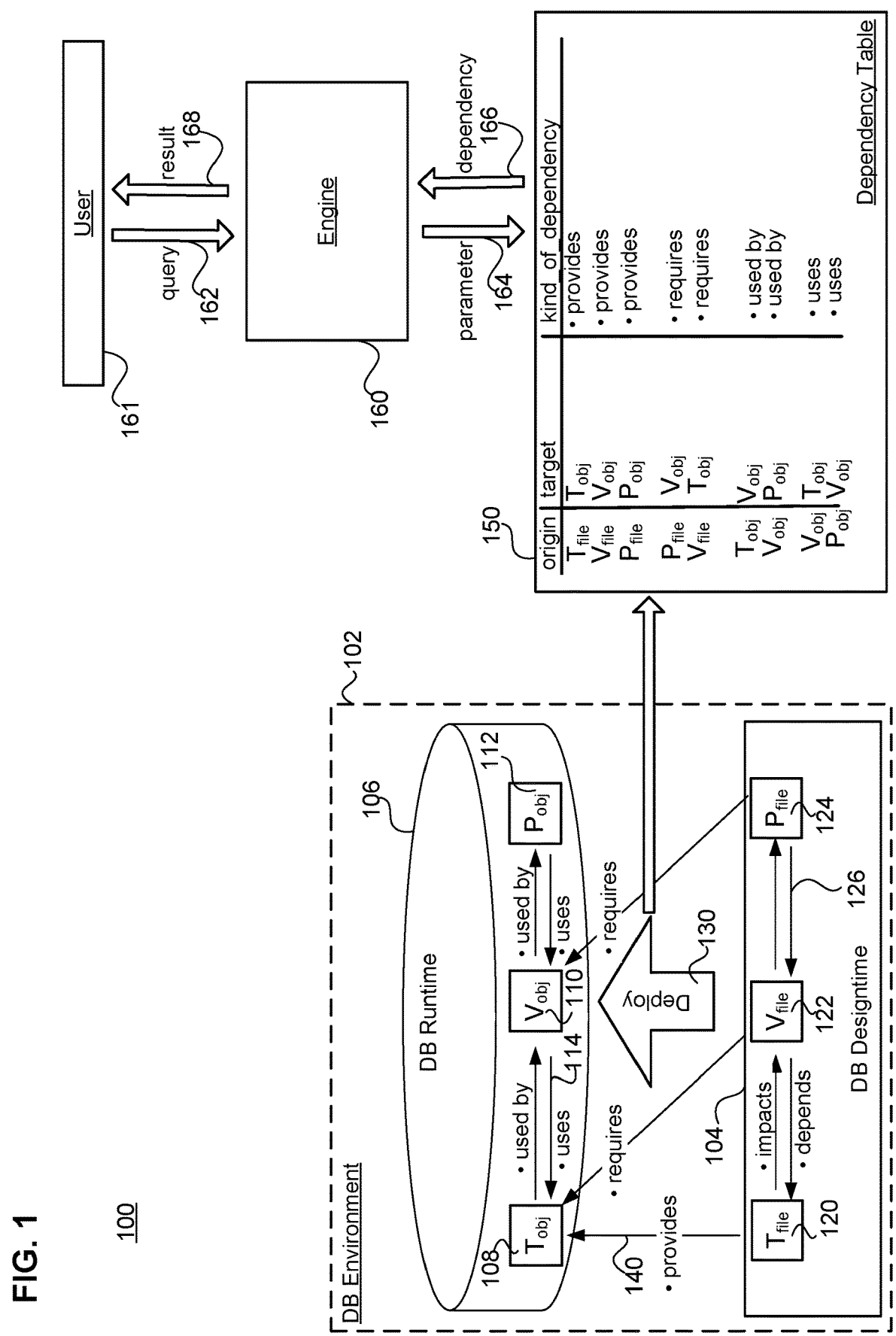
FIG. 1 shows a simplified diagram of a system according to an embodiment.

FIG. 1 shows a simplified view of a system configured to perform dependency mapping in a database environment according to an embodiment. Specifically, system 100 comprises a database environment 102 comprising a database designtime 104 and a database runtime 106.

The database runtime comprises various data objects having a structure reflection relationships between data stored in the database. One example of a runtime data object is a table ($T_{obj}$) 108. Another example of a runtime data object is a view ($V_{obj}$) 110 that may use a table object. Still another example of a runtime data object is a Procedure ($P_{obj}$) 112 that may use a view object.

Different types of dependencies 114 may exist between various data objects of the runtime. For example, the table $T_{obj}$ may be said to be "used by" the view $V_{obj}$ that $T_{obj}$ is used to create. Conversely, the reciprocal dependency is expressed as the view object "requiring" the table object.

Objects can be created at designtime for execution at runtime of an application. The database designtime comprises various files defining the different objects of the database.

One example of a designtime file ($T_{file}$) 120 defines a runtime table data object. Another example of a designtime file ($V_{file}$) 122 defines a runtime view data object. Still another example of a designtime file ($P_{file}$) 124 defines a runtime procedure data object.

Different types of dependencies 126 may also exist between various files of the designtime. For example, the table $T_{file}$ may be said to "impact" the view $V_{file}$. Conversely, the reciprocal dependency is expressed as the view file "depending" from the table file.

A deployment infrastructure 130 may be responsible for deploying the files of the designtime for use in creating the data objects of the runtime. This deployment creates dependencies 140 between the data objects of the runtime, and the corresponding files in the designtime.

Dependencies within the designtime, dependencies within the runtime, and dependencies between the design time and the runtime arising during the deployment process, are extracted and stored in the dependency table 150. As shown, that table may list a dependency by origin, target, and dependency type.

Some embodiments of the deployment infrastructure may use containers and/or container models for the purposes of deploying database objects. A container can correspond to a database schema. Containers can be used for multiple deployments of the same database artifacts, for development sandboxes, etc. Containers can be isolated from each other by various database mechanisms, e.g., each database schema with its deployed database objects can be owned by a per-schema technical database user. In some implementations, a cross-container access at the database level can be permitted (via database privileges) and/or prohibited.

Some embodiments of the deployment infrastructure can allow modeling of a networked set of persistence objects (e.g., tables, sequences, etc.), views, procedures, functions, data flows, etc. that can be later deployed. These objects can be converted into file-based artifacts, which can simplify dependency-based deployment, re-deployment, and/or undeployment of objects. It can also facilitate lifecycle management aspects, such as transport of objects. File-based artifacts can also allow separation of uploading of the artifacts into deployment infrastructure (i.e., staging), and deployment of the artifacts. Additionally, the artifacts can simplify incremental deployment scenarios where only modified files can be uploaded. The file artifacts can represent the target state of the database objects, e.g., they specify a view definition in a declarative way (for example, instead of imperative CREATE, ALTER, DROP statements).

While the particular embodiment of FIG. 1 shows the dependency table as being separate from the database environment, this is not required. In some embodiments the dependency table could be present within the database itself.

The system of FIG. 1 further comprises a processing engine 160 that is in communication with the dependency table. That processing engine is configured to receive from a user 161, a query 162 regarding the nature of the dependencies present in the database environment. The engine recognizes within the query, certain parameters 164 present in the dependency table. Examples of parameters can include data objects, files, and particular dependency types.

Based upon the parameters received, the engine executes a search upon the dependency table to identify matching data relevant to the query. The results of the search are returned to the engine in the form of a dependency mapping 166. Such a mapping may identify objects and files and corresponding dependencies between them. The mapping is in turn returned by the engine to the user as a query result 168.

While the particular embodiment of FIG. 1 shows the engine as being separate from the database environment, this is not required. In various embodiments the engine could be implemented within the database itself, for example leveraging the powerful processing power available to an in-memory database engine.

Figure 2:
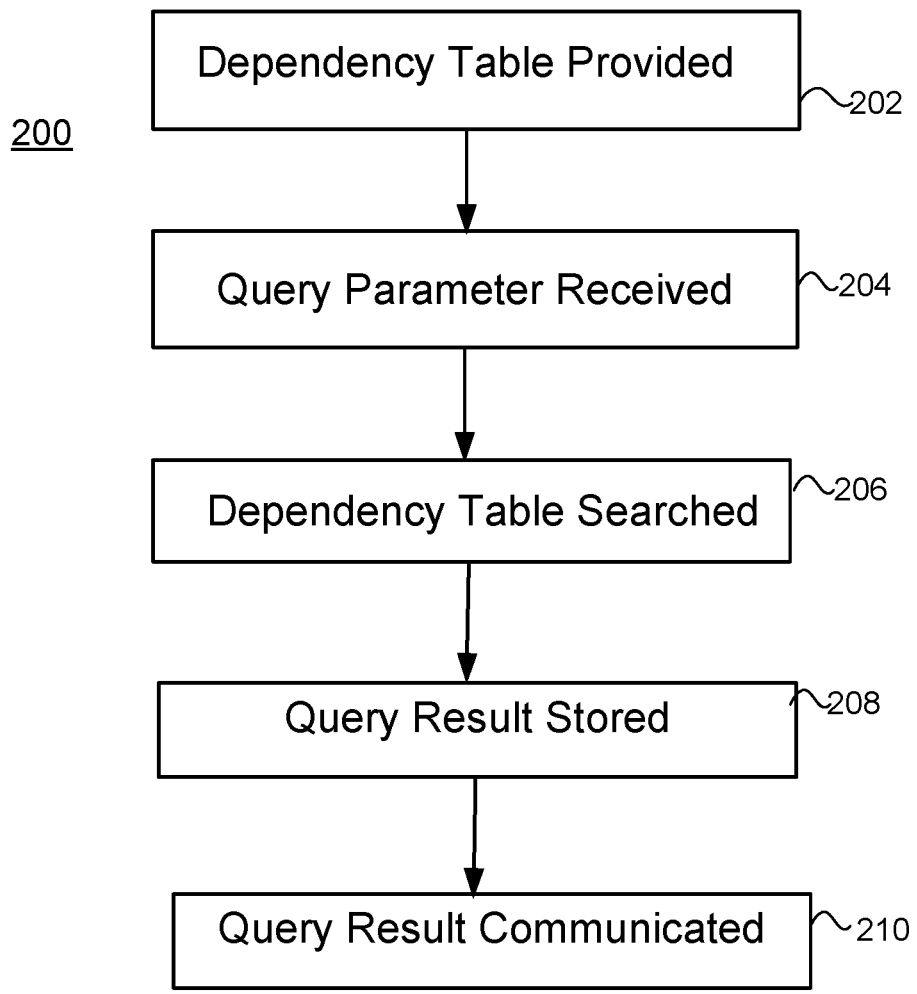
FIG. 2 shows a simplified flow diagram of a method according to an embodiment.

FIG. 2 is a flow diagram showing various actions taken in accordance with an embodiment of a method. Specifically, at 202 a dependency table is provided comprising a first dependency in a database environment, the first dependency between a first designtime file and a first runtime data object defined by the first designtime file.

At 204 a query parameter is received from a user. At 206 the dependency table is searched to identify the first dependency.

At 208 a query result comprising the first dependency is stored. At 210 the query result is communicated to the user.

Various details of implementing a dependency mapping in a database environment according to particular embodiments, are now discussed in connection with the specific example of FIG. 3.

Example

This example is provided in the context of the HANA in-memory database environment available from SAP SE, of Walldorf, Germany. The HANA Deployment Infrastructure (HDI) a service layer simplifying deployment of database artifacts by providing a declarative approach for defining database objects and ensuring a consistent deployment into the database, based on a transactional all-or-nothing deployment model and implicit dependency management.

Deployment of database objects via HDI is based on a container model where each container corresponds to a database schema. Containers are isolated against each other utilizing database features: e.g., each database schema with its deployed objects is owned by a per-schema technical database user.

According to embodiments, HDI may perform mapping between:
  files created by developers at designtime and containing the definition of a database table,
  database objects (e.g., database tables, database views, etc.) created by HDI at runtime based upon the designtime definition.

Under the HDI, database objects can be written in a schema-free way (e.g., no explicit schema references) to allow deployment of the same database objects into different containers. References to schema-external objects can be created using synonyms which can be bound during deployment. The synonyms can provide schema-local names for the schema-external objects.

Such use of synonyms can give rise to complex (i.e., other than one-to-one) dependencies between designtime files and runtime database objects. For example a many-to-one relationship (i.e., one database object is provided by multiple files) may arise where a database synonym configuration in HANA DI is employed.

Figure 3:
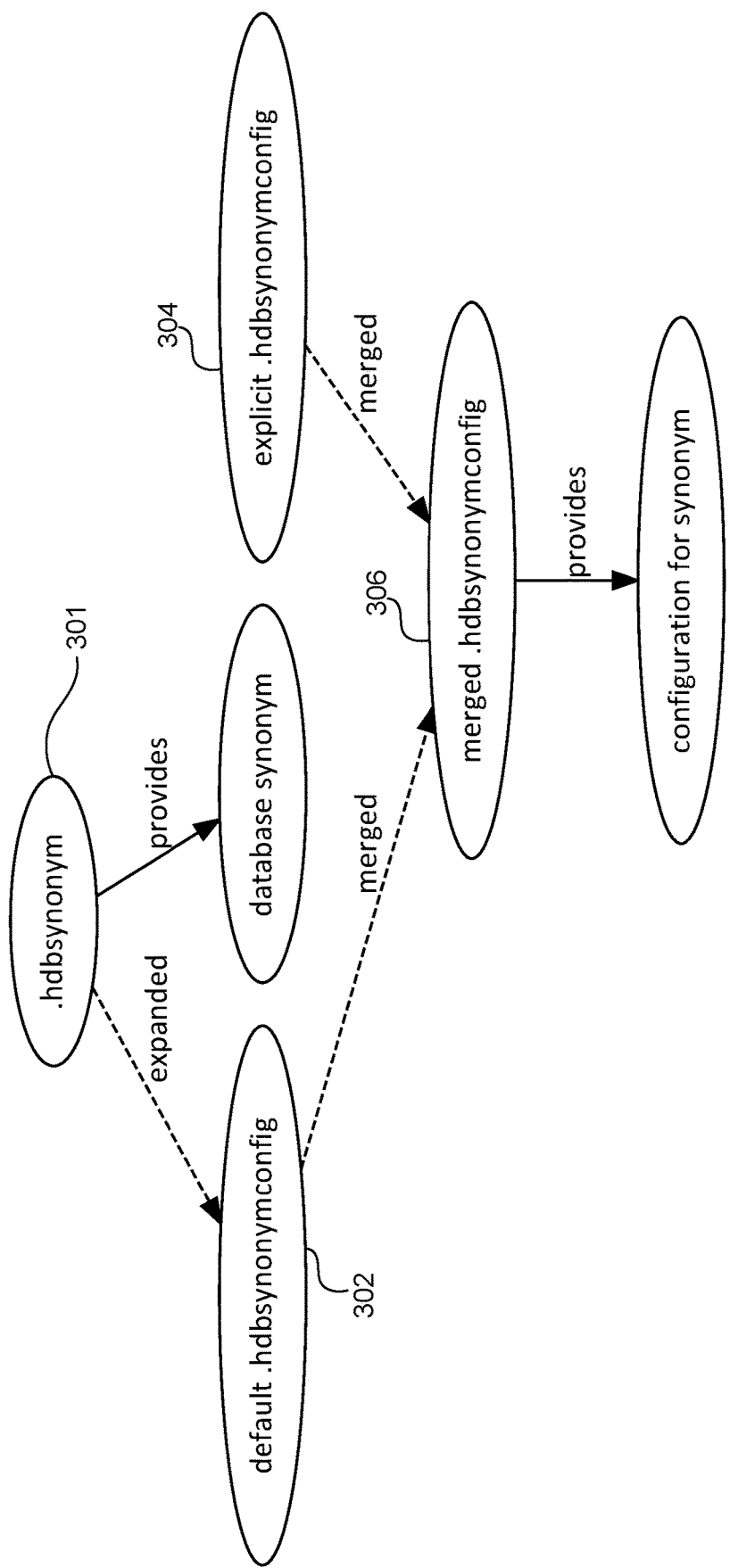
FIG. 3 shows an example of dependencies between files and objects according to an embodiment.

FIG. 3 specifically shows such a complex dependency mapping 300 comprising a dependency path arising from the use of synonyms. Specifically, FIG. 3 shows a many-to-one dependency provided by a default configuration of a .hdbsynonym file 301 and, optionally, an explicit configuration of a .hdbsynonymconfig file 304 overwriting the default configuration.

FIG. 3 shows the realization of dependency mapping via implicitly generated files called expansions and merges.
  Multiple expansions can be generated from the same real file, and typically provide one of the artifacts defined there. For example, the default configuration in the .hdbsynonym file 301 is expanded to the .hdbsynonymconfig file 302.
  A merge is generated from multiple files providing the same artifacts. In the specific example of FIG. 3 the default .hdbsynonymconfig 302 expanded from a .hdbsynonym file 301, is merged with the explicit .hdbsynonymconfig 304, thereby generating the actual configuration for the database synonym 306.

In order to map such complex dependencies, embodiments reference dependencies metadata about "provides" (file provides object) and "requires" (object requires file) that is stored in the dependency table. The getProviders method of HDI (discussed below), retrieves the relevant metadata and assigns "provides" of the generated files to the real files they were generated from (since only those are visible outside).

In HANA DI, parameters allow controlling the execution flow of HANA DI procedure calls. There are three types of parameters in HANA DI: HANA DI parameters; build plugin parameters, and path parameters.

HANA DI parameters are used to control the execution flow of HANA DI procedures and HANA DI container-specific procedures. That is, HANA DI parameters specify the time a container operation waits for a locking conflict to clear, or indicate if warnings during a HANA DI call should be treated as errors.

Build plugin parameters and path parameters control the execution flow of the deployment process of database artifacts. For example, these parameters specify the batch size for batching database access or for batch processing within a build plugin. While a build plugin parameter controls the execution flow of a build plugin for all database artifacts of the corresponding type, a path parameter determines the execution flow of a single database artifact.

One available HDI parameter is "variant". This specifies the variant of the HANA DI container-specific procedure <container>#. Examples of DI.GET_DEPENDENCIES that may be used for mapping purposes according to embodiments include the following.
  One possible value is "providers". This parameter value returns the providing file for a given database object. In certain embodiments, "providers" is the default value.
  Another possible parameter value is "provides_and_requires". For a given database object, this returns the provided and required database objects.
  Still another possible parameter value is "impacted". This parameter value returns the files that depend on the given files at designtime.
  Yet another possible value is "depends". This parameter value returns the files that the given files depend on.
  Another possible value is "recursively". This parameter value results in iterating through the dependency pathways set forth in the dependency table and returning all elements in a dependency chain.

Thus FIG. 3 depicts an example where, for a synonym configuration, the merged .hdbsynonymconfig file 306 is found as provider. That merged .hdbsynonymconfig file has been generated from the explicit .hdbsynonymconfig (a real file) and the expanded default .hdbsynonymconfig, which was generated from the .hdbsynonym. So, the providers returned to a user would be the explicit .hdbsynonymconfig file and the .hdbsynonym file.

Accordingly, for tools used in developing HDI content in this example, embodiments show the dependencies between database objects and the tiles providing them. In this manner, a developer may determine those files from which a specific deployed database synonym originated.

While the example of FIG. 3 has illustrated a dependency in the form of a many-to-one relationship between files and a database object, embodiments are not limited to mapping this type of complex dependency. For example, a one-to-many relationship (i.e., one file providing multiple database objects) may arise where a .hdbcds file defines multiple database objects, and a .hdbsynonym file defines one or more database synonyms.

And while the example of FIG. 3 has illustrated a complex dependency arising from the use of a synonym function, embodiments are also not limited to this particular situation. Rather, embodiments may be configured to provide dependency mapping in a variety of situations, and in particular dependencies arising from such features as version control and lifecycle management.

Figure 4:
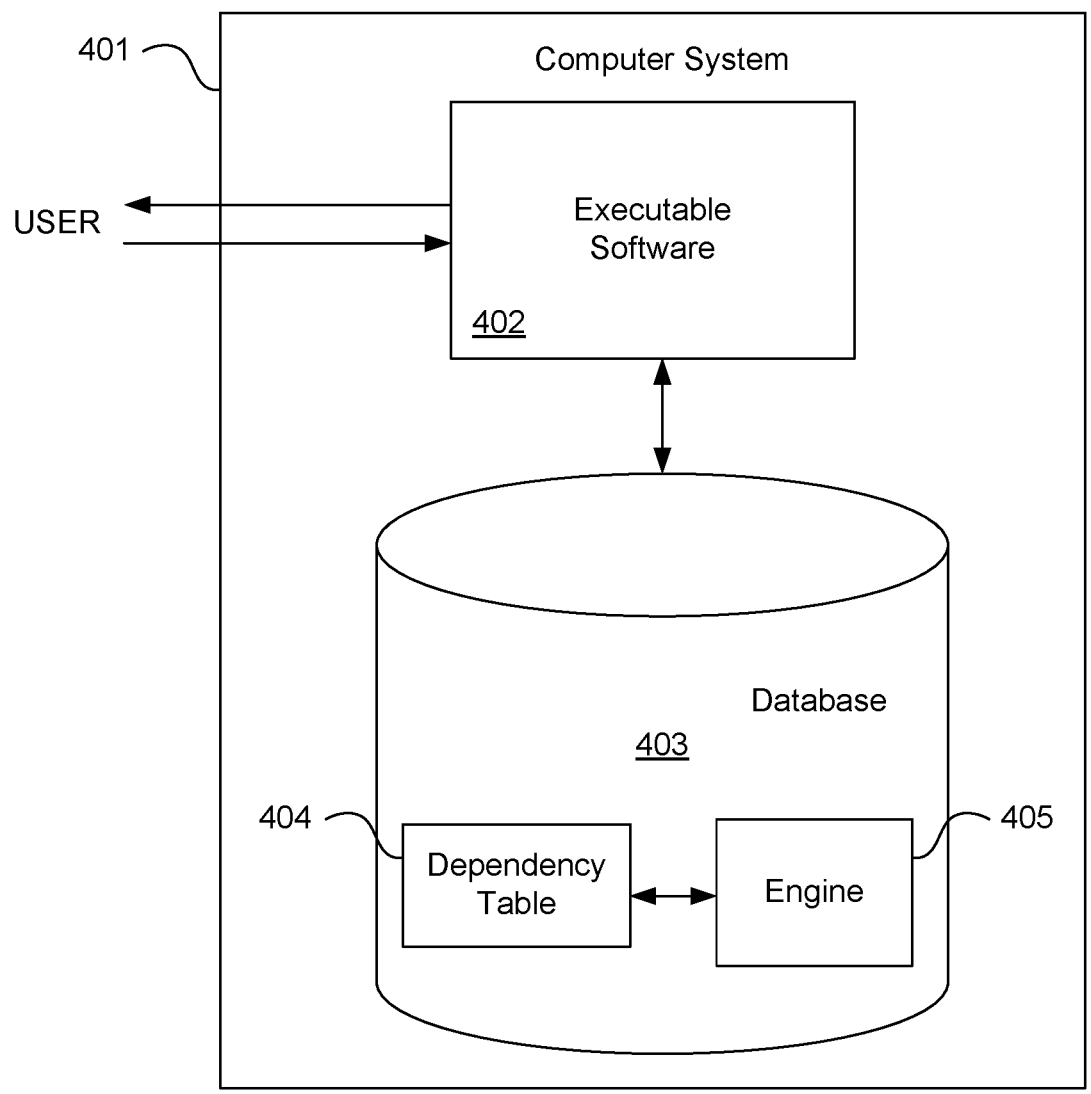
FIG. 4 illustrates hardware of a special purpose computing machine configured to perform dependency mapping according to an embodiment.

FIG. 4 illustrates hardware of a special purpose computing machine configured to implement dependency mapping in a database environment according to an embodiment. In particular, computer system 401 comprises a processor 402 that is in electronic communication with a non-transitory computer-readable storage medium comprising a database 403. This computer-readable storage medium has stored thereon code 405 corresponding to an engine. Code 404 corresponds to dependency table. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 5:
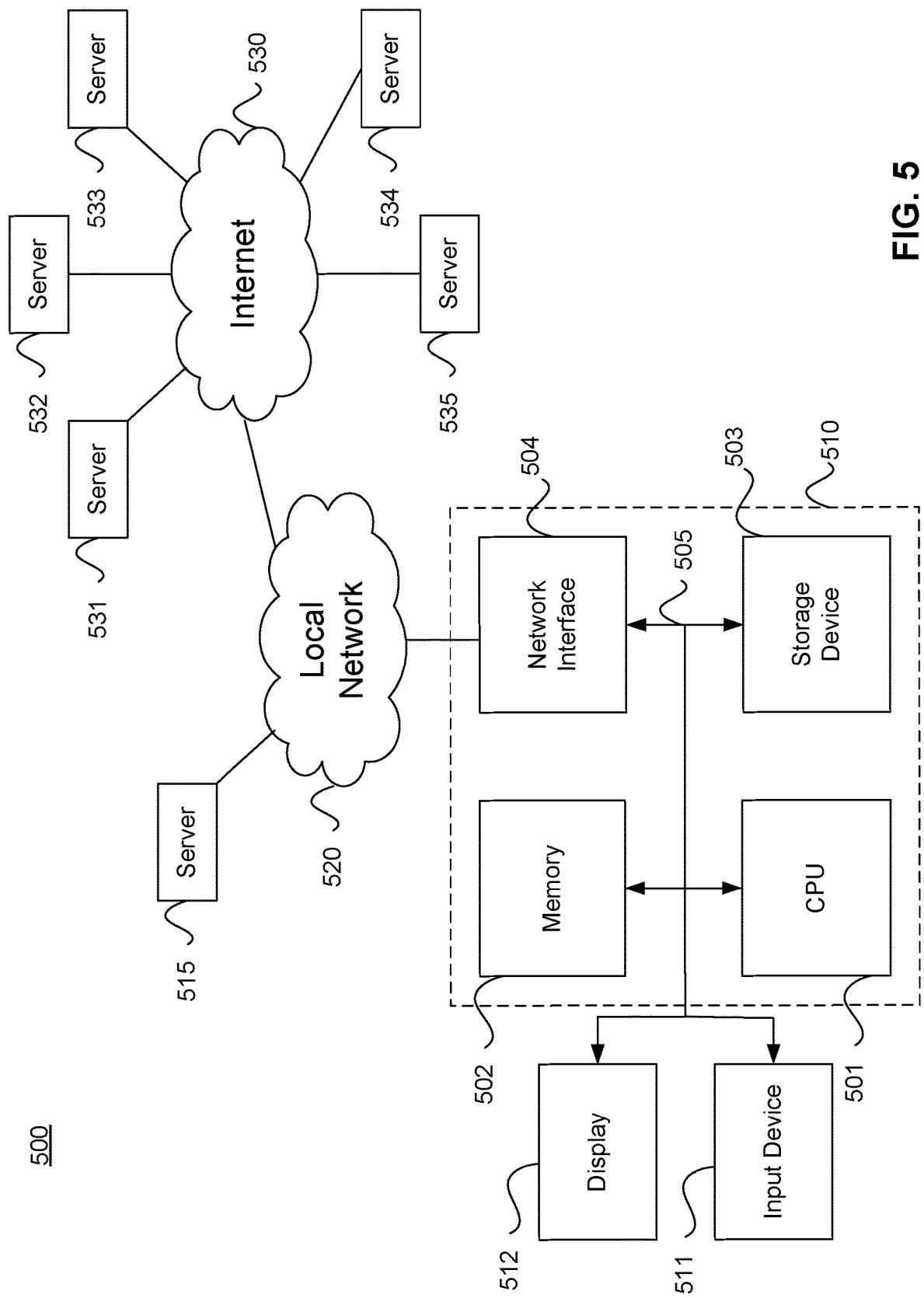
FIG. 5 illustrates an example computer system.

An example computer system 500 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving a query parameter regarding an in-memory database environment comprising a first designtime file and a first runtime data object defined by the first designtime file;
an in-memory database engine of the in-memory database environment searching, with reference to the query parameter, a dependency table comprising a first dependency comprising a many-to-one dependency in the in-memory database environment between the first designtime file and the first runtime data object, the dependency table being stored in an in-memory database of the in-memory database environment, wherein searching the dependency table comprises recursively searching the dependency table to identify a second dependency comprising the many-to-one dependency;
the in-memory database engine storing a query result including the first dependency and a dependency path including the second dependency; and
the in-memory database engine communicating the query result to a user, the query result comprising a dependency mapping including a first arrow with a first metadata label indicating the first dependency, and a second arrow with a second metadata label indicating the second dependency.

2. A method as in claim 1 wherein the query parameter specifies the first designtime file.

3. A method as in claim 1 wherein the query parameter specifies the first runtime data object.

4. A method as in claim 1 wherein:
the first designtime file also defines a second runtime data object of the database environment; and
the first dependency is further between the first designtime file and the second runtime data object.

5. A method as in claim 1 wherein:
a second designtime file of the database environment also defines the first runtime data object; and
the first dependency is further between the second designtime file and the first runtime data object.

6. A method as in claim 1 wherein recursively searching the dependency table identifies the second dependency between the first designtime file and a second designtime file of the database environment.

7. A method as in claim 1 wherein recursively searching the dependency table identifies the second dependency between the first runtime data object and a second runtime data object of the database environment.

8. A non-transitory computer readable storage medium embodying a computer program for performing a method, said method comprising:
receiving a query parameter regarding an in-memory database environment comprising a first designtime file and a first runtime data object defined by the first designtime file;
an in-memory database engine of the in-memory database environment searching, with reference to the query parameter, a dependency table comprising a first dependency comprising a many-to-one dependency in the in-memory database environment between the first designtime file and the first runtime data object, the dependency table being stored in an in-memory database of the in-memory database environment, wherein searching the dependency table comprises recursively searching the dependency table to identify a second dependency comprising the many-to-one dependency;

the in-memory database engine storing a query result including the first dependency and a dependency path including the second dependency; and the in-memory database engine communicating the query result to a user, the query result comprising a dependency mapping including a first arrow with a first metadata label indicating the first dependency, and a second arrow with a second metadata label indicating the second dependency.

9. A non-transitory computer readable storage medium as in claim 8 wherein the second dependency is between the first designtime file and a second designtime file of the database environment.

10. A non-transitory computer readable storage medium as in claim 8 wherein the second dependency is between the first runtime data object and a second runtime data object of the database environment.

11. A non-transitory computer readable storage medium as in claim 8 wherein:
the first designtime file also defines a second runtime data object of the in-memory database environment; and
the first dependency is further between the first designtime file and the second runtime data object.

12. A non-transitory computer readable storage medium as in claim 8 wherein:
a second designtime file of the database environment also defines the first runtime data object; and
the first dependency is further between the second designtime file and the first runtime data object.

13. A computer system comprising:
one or more processors;
a software program, executable on said computer system, the software program configured to cause an engine of an in-memory database to:
store in the in-memory database, a dependency table comprising a first dependency between a first designtime file and a first runtime data object defined by the first designtime file the first dependency comprising a many-to-one dependency;
in response to a query parameter received from a user, recursively search the dependency table to identify the first dependency and a second dependency comprising the many-to-one dependency;
store in the in-memory database, a query result including the first dependency and a dependency path including the second dependency; and
communicate to the user, a query result comprising the first dependency, the query result comprising a dependency mapping including a first arrow with a first metadata label indicating the first dependency, and a second arrow with a second metadata label indicating the second dependency.

14. A computer system as in claim 13 wherein:
the first designtime file also defines a second runtime data object of the database environment; and
the first dependency is further between the first designtime file and the second runtime data object.

15. A computer system as in claim 13 wherein:
a second designtime file of the database environment also defines the first runtime data object; and
the first dependency is further between the second designtime file and the first runtime data object.

* * * * *